(12) United States Patent
Bohnert et al.

(10) Patent No.: US 10,766,219 B2
(45) Date of Patent: Sep. 8, 2020

(54) PRESSING DEVICE

(71) Applicant: Johannes Bohnert, Ottenhofen (DE)

(72) Inventors: Johannes Bohnert, Ottenhofen (DE); Simon Bauerle, Karlsruhe (DE)

(73) Assignee: Johannes Bohnert, Ottenhöfen (DE)

( * ) Notice: Subject to any disclaimer, the term of this patent is extended or adjusted under 35 U.S.C. 154(b) by 529 days.

(21) Appl. No.: 15/100,520

(22) PCT Filed: Nov. 27, 2014

(86) PCT No.: PCT/EP2014/003174
§ 371 (c)(1),
(2) Date: May 31, 2016

(87) PCT Pub. No.: WO2015/082059
PCT Pub. Date: Jun. 11, 2015

(65) Prior Publication Data
US 2016/0297160 A1    Oct. 13, 2016

(30) Foreign Application Priority Data

Dec. 3, 2013    (DE) .......................... 10 2013 018 093

(51) Int. Cl.
*B30B 9/24*    (2006.01)
*F26B 5/14*    (2006.01)
(Continued)

(52) U.S. Cl.
CPC ............ *B30B 9/247* (2013.01); *B01D 33/042* (2013.01); *B30B 9/241* (2013.01); *B65G 17/38* (2013.01);
(Continued)

(58) Field of Classification Search
CPC ........... B30B 9/24; B30B 9/241; B30B 9/246; B30B 9/247; B30B 9/321; B30B 5/02;
(Continued)

(56) References Cited

U.S. PATENT DOCUMENTS 3,581,901 A    6/1971  Gujer et al.
4,425,842 A *  1/1984  Winch .................. D06B 15/02
                                                            100/118
(Continued)

FOREIGN PATENT DOCUMENTS

DE    202011102965    1/2012
FR         538228    6/1922
(Continued)

*Primary Examiner* — Shelley M Self
*Assistant Examiner* — Katie L. Parr
(74) *Attorney, Agent, or Firm* — Volpe and Koenig, P.C.

(57) ABSTRACT

A pressing device having an endless conveyor which includes conveying elements connected to each other to form and endlessly revolving track. Adjacent conveying elements are pivotally connected together via pins forming pivot axes. A press roller is provided in a pressing zone to apply pressure to the material to be pressed, which is conveyed on the endless conveyor. Adjacent conveying elements of the endless conveyor have intermeshing fingers, and the pin connecting the conveying elements penetrates these fingers, such that in the pressing zone the conveying elements assume a pivot position with respect to each other in which the outer side of the endless conveyor forms a closed, plate-like surface without protrusions of recesses. The pressing zone follows a break open zone in the circumferential direction of the endless conveyor, and in the break open zone the endless conveyor is deflected such that the outer side thereof is concavely bent.

24 Claims, 6 Drawing Sheets

Figure 1:
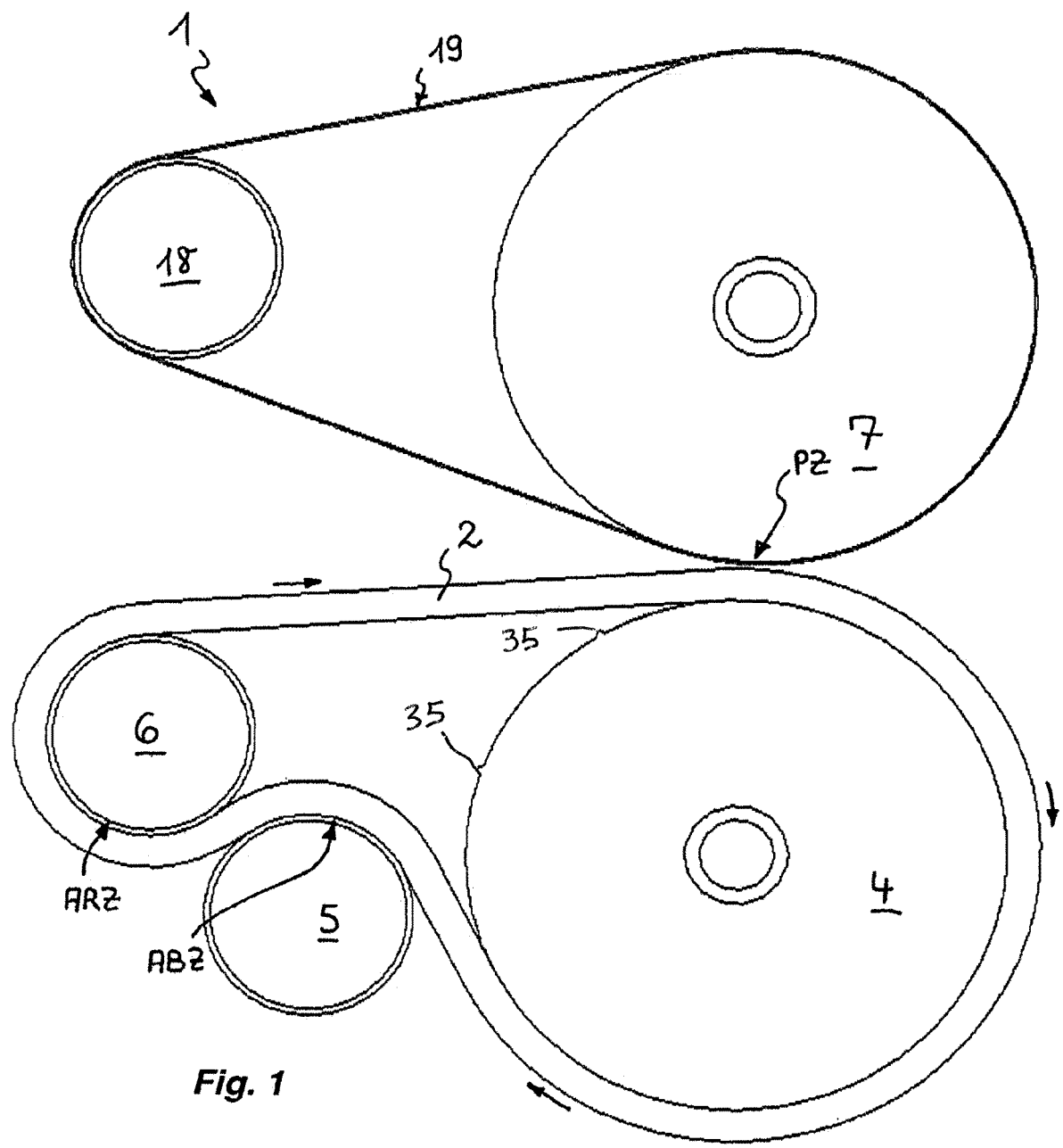

(51) Int. Cl.
*B65G 17/38* (2006.01)
*B01D 33/04* (2006.01)
*B65G 17/40* (2006.01)

(52) U.S. Cl.
CPC ................ *B65G 17/40* (2013.01); *F26B 5/14* (2013.01); *F26B 2200/04* (2013.01); *F26B 2200/24* (2013.01)

(58) Field of Classification Search
CPC .. B30B 5/04; B30B 5/06; B01C 33/04; B01C 33/042; B65G 17/38; B65G 17/40; B65G 17/26; F26B 15/14; F26B 5/14; Y10S 100/902; B01D 33/04; B01D 33/042; B01D 33/056
USPC .......... 100/37, 118, 151, 902, 114; 210/358, 210/400, 402; 198/853, 850
See application file for complete search history.

(56) References Cited

U.S. PATENT DOCUMENTS

| | | | | |
|---|---|---|---|---|
| 4,935,138 A | * | 6/1990 | Gaudfrin | B01D 33/042 100/118 |
| 5,192,413 A | * | 3/1993 | Yamaguchi | B01D 33/04 204/629 |
| 5,385,244 A | * | 1/1995 | Kunig | A22C 17/04 209/699 |
| 5,560,834 A | * | 10/1996 | Gold | B01D 33/04 210/783 |
| 6,871,744 B2 | * | 3/2005 | Miller | B01D 33/042 210/350 |
| 2005/0061636 A1 | * | 3/2005 | Frost | B65G 17/38 198/850 |
| 2013/0129887 A1 | * | 5/2013 | Hoppe | A22C 17/04 426/479 |

FOREIGN PATENT DOCUMENTS

| | | | |
|---|---|---|---|
| FR | 26637 | | 2/1924 |
| JP | S4993462 | | 8/1974 |
| JP | S61259898 | | 11/1986 |
| JP | S62141338 | | 6/1987 |
| JP | H02138093 | | 5/1990 |
| JP | H03-15279 | * | 2/1991 |
| SU | 486919 | | 1/1976 |
| SU | 578198 | | 10/1977 |

* cited by examiner

PRESSING DEVICE

BACKGROUND

The invention relates to a pressing device with an endless conveyor which has a multiplicity of conveying links which are connected to one another to form an endlessly revolving track and of which adjacent conveying links are pivotally connected to one another in each case via a pin forming a pivot axes, and with at least one pressing roll which is provided in a pressing zone in order to pressurize the pressing material, which is conveyed on the endless conveyor between the pressing roll and the endless conveyor, wherein adjacent conveying links of the endless conveyor have intermeshing fingers, through which fingers the pin connecting said conveying links passes, and wherein the conveying links take up such a pivoted position with respect to one another in the pressing zone that the outside of the endless conveyor form a protrusion and recess less surface, which is closed in a plate shaped manner, in this region.

A pressing device of the type mentioned at the beginning, which is provided as a wine press, is already known from FR 538 228 A. The previously known pressing device has an endless conveyor which has a multiplicity of conveying links which are connected to one another to form an endlessly revolving track. Adjacent conveying links which are connected pivotally to one another in each case via a pin forming a pivot axes have intermeshing fingers, through which the pin connecting said conveying links passes. The previously known pressing device has two pressing rolls which follow each other in the conveying direction and are each provided for pressurizing the pressing material, which is conveyed on the endless conveyor, between the pressing roll and the endless conveyor. While the larger pressing roll, which is the front pressing roll in the conveying direction and which acts upon the upper strand of the endless conveyor approximately centrally, defines a first pressing zone, the smaller pressing roll, which is the rear pressing roll in the conveying direction and forms a second pressing zone, presses against the endless conveyor in the region of one of the deflection rollers. The smaller pressing roll, which is provided in the second pressing zone, revolves here at a higher revolving speed than the pressing roll arranged in the first pressing zone (page 2, lines 27 to 30 of FR 538 228 A). So that only the white grape juice and not also the red dye in the skins is squeezed out of red grapes (page 1, lines 29 to 33 of FR 538 228 A), the two press rolls act upon the endless conveyor with a comparatively low pressure, wherein the pressing roll arranged in the second pressing zone also has an elastic surface made from rubber or the like (page 1, line 62 to page 2, line 4 of FR 538 228 A). Since the pressing rolls act upon the endless conveyor and upon the pressing material located thereon with a comparatively low pressing pressure, there is also not a risk in the previously known pressing device that the pressing material is pressed into the conveying links of the endless conveyor; on the contrary, said pressing material drops in the deflection region between upper and lower strand of the endless conveyor.

The earlier document FR 26 637 E belonging to the same applicant relates merely to the configuration of the conveying links of the endless conveyor used in the previously known pressing device.

JP 1102 138093 U already discloses a pressing device which has an endless conveyor guided around two deflection rollers. This endless conveyor, the upper strand of which is acted upon approximately centrally between the deflection rollers by a pressing roll, is formed in the manner of a chain from conveying links which have an approximately concave external contour in side view. JP 1102 138093 U is not concerned with the problem of by which means the disturbance-free operation of the endless conveyor could be ensured even over a relatively long period of operation.

German utility model document DE 20 2011 102 965 U1 has already previously disclosed a pressing device which has an endless conveyor with which the pressing material is movable toward a pressing zone. The endless conveyor of the previously known pressing device is designed as a plate chain, the plates of which serving as conveying links are connected to one another to form an endlessly revolving track. Adjacent plates are connected pivotally to one another in each case via a pin forming a pivot axes. A pressing roll is arranged in the pressing zone of the previously known pressing device, said pressing roll being provided in a pressing zone for pressurizing the pressing material, which is conveyed on the endless conveyor, between the pressing roll and the endless conveyor.

The device previously known from DE 20 2011 102 965 U1 is intended for the mechanical drying of wood chips in order to reduce the wood moisture contained in the wood chips before the latter are burned. However, such pressing devices of the type mentioned at the beginning are usable for very varied applications in order to dehumidify or to compress a pressing material, which is intended for further use, and/or in order to obtain the fluid contained in a pressing material, for the purpose of further use.

DE 20 2011 102 965 U1 does not describe further how the plate chain serving there as an endless conveyor has to be configured, the plate chain being capable of withstanding high pressure loadings such that as high a performance of the pressing device as possible is ensured.

SUMMARY

It is therefore in particular the object to provide a pressing device of the type mentioned at the beginning which is distinguished by high load-bearing capacity and efficiency.

This object is achieved according to the invention, in the case of the pressing device of the type mentioned at the beginning, in particular in that the pressing zone is followed by a breaking-open zone in the revolving direction of the endless conveyor, in which breaking-open zone the endless conveyor is deflected in such a manner that the outside thereof is bent concavely.

The pressing device according to the invention has an endless conveyor, in which adjacent conveying links have intermeshing fingers, through which fingers the pin connecting said conveying links passes. In the pressing zone, the conveying links take up such a pivoted position with respect to one another that the outside of the endless conveyor forms a protrusion- and recess-less surface, which is therefore closed in a plate-shaped or plate-like manner, in this region, with said surface being capable of withstanding even high pressurization without there needing to be a concern that relatively large quantities of the pressing material will be pressed through the endless conveyor as far as the inside thereof. Since adjacent conveying links of the endless conveyor have intermeshing fingers, through which the pin connecting the conveying links passes, the pin of the adjacent conveying links is also arranged in a protected manner, wherein the intermeshing fingers ensure a closed plate-shaped surface on the outside of the endless conveyor even in this region. The at most small quantity of the pressing material, which is pressed in the pressing zone into the endless conveyor, are also removed from the endless conveyor after the pressing zone because the pressing zone is followed by a breaking-open zone in the revolving direction of the endless conveyor, in which breaking-open zone the endless conveyor is deflected in such a manner that the outside thereof is bent concavely. The pressing device according to the invention is therefore distinguished by an endless conveyor which has a high load-bearing capacity and on which the pressing material can be pressurized in such a manner that the moisture in the pressing material can be separated particularly readily from the dry mass of the pressing material. The pressing device according to the invention is therefore also distinguished by high efficiency.

It is possible for at least one conveying link to be formed integrally and, on its outside circumferential partial region facing an adjacent conveying link, to bear at least one protruding finger. Such integrally formed conveying links may be appropriate in the case of particularly high pressure loadings, but such integral conveying links can be produced only with a high outlay.

In an embodiment according to the invention that can be produced with a lower outlay and nevertheless has a high load-bearing capacity, at least one conveying link is formed from at least two conveying link plates which bear against one another on the flat sides and which are connected in an offset manner to one another such that a partial region of at least one second conveying link plate, which partial region protrudes over at least one first conveying link plate, is designed as a finger. In this embodiment, the at least one conveying link is formed as a package from at least two conveying link plates bearing against one another on the flat sides. These conveying link plates can be produced with a low outlay, wherein the protruding fingers of the at least one conveying link are formed by the offset arrangement of the conveying link plates.

In an embodiment according to the invention which is particularly simple, has a high load-bearing capacity and can be produced with a low outlay, at least one conveying link is designed as a plate packet which is formed either from at least one first and two second conveying link plates or conversely from at least two first conveying link plates and one second conveying link plate.

Since the endless conveyor used according to the invention forms a protrusion- and recess-less, plate-shaped surface on its outside in the pressing zone, and since the pressing device according to the invention is distinguished by high efficiency and therefore also by high quantities of squeezed-out fluid, in a preferred embodiment according to the invention the endless conveyor has, on its inside, hollows oriented transversely with respect to the conveying direction.

In a preferred embodiment according to the invention, the hollows are designed as flutes or channels oriented at right angles to the conveying direction.

In order to promote a continuous and uniform revolving movement of the endless conveyor, it is advantageous if the hollows are arranged distributed at uniform distances over the inner circumference of the endless conveyor.

So that the pressing material portions which are loosened in the breaking-open zone can be removed from the gaps in the endless conveyor, it is advantageous if a clearing-out zone in which the endless conveyor is deflected in such a manner that its outside is bent convexly is arranged between the breaking-open zone and the pressing zone in the revolving direction of the endless conveyor.

In a preferred development according to the invention, the endless conveyor revolves about a deflection roller or deflection roll in the pressing zone, and the deflection roller or deflection roll and also the pressing roll or pressing roller are at the smallest distance from each other at a point or in a region which is arranged on a line or plane running through the axes of rotation of said rollers or rolls.

In order, in the clearing-out zone, to be able to remove the pressing material portions previously loosened in the breaking-open zone, an embodiment is preferred in which the deflection roller provided in the pressing zone has a larger diameter than the deflection roller arranged in the breaking-open zone and/or in the clearing-out zone.

In order to promote the pivotable connection of the adjacent conveying links, on the one hand, and of the pin passing through the fingers, on the other hand, it is advantageous if the fingers of the conveying links each have a hole, in which holes the pin connecting adjacent conveying links passes through the conveying links.

In order not to have to oil the pivoting zone between the pin, on the one hand, and the conveying links connected to one another by the pin, on the other hand, in such a manner that the oil is subsequently also contained in the squeezed out fluid, it is advantageous if the pins and/or the holes provided on the fingers of the conveying links have a low-friction or friction-reducing coating and in particular a TEFLON™ (Polytetrafluoroethylene) coating.

So that the fluid which is contained in the pressing material and is squeezed out in the region of the pressing zone can easily pass through the conveying links of the endless conveyor and can flow off rapidly on the inside of the endless conveyor, it is advantageous if a flat-sided molding which is open toward the inside is provided at least on one side of the fingers of the conveying links.

In a preferred embodiment according to the invention, the fingers toward the outside of the endless conveyor have a greater thickness than the finger partial region otherwise surrounding the hole in the corresponding finger.

In the breaking-open zone, the endless conveyor is deflected in such a manner that the outside of the endless conveyor adopts a concavely bent contour. By means of this concave bending of the endless conveyor in the breaking-open zone, the transverse and longitudinal gaps in the endless conveyor open to a very wide extent and the pressing material portions possibly squeezed into the endless conveyor are released. Opening of the transverse and longitudinal gaps in the endless conveyor is also promoted here if the radius on the outside of the transverse gaps in a conveying link have a differing and preferably a larger radius than the radius on the inside of the transverse gaps of the associated adjacent conveying link, in particular in such a manner that said conveying links form a closed outside of the endless conveyor in the pressing zone and, in the breaking-open zone, opening of the transverse gaps between said conveying links takes place. The concave bending in the breaking-open zone results, in association with the geometry mentioned, in further opening of the gaps and therefore in loosening of the penetrated pressing material. The opening of the transverse gaps is promoted here if the radius on the outside of the transverse gap is larger than the radius on the inside of the transverse gap.

In order to configure the pressing device according to the invention with a highest possible load-bearing capacity and in order to be able to transmit the pressing pressure to the pressing material in unweakened fashion as far as possible, it is advantageous if the conveying links have, on their lower side forming the inside of the endless conveyor, a radius which approximately corresponds to the radius of the deflection roller arranged in the pressing zone.

In order to form the endless conveyor on its outer circumference with a surface which is closed as far as possible, it is advantageous if the conveying links have, on their outer side forming the upper side of the endless conveyor, a larger radius than the radius provided on the lower side of the conveying links, corresponding to the overall height of the endless conveyor.

So that the liquid escaping from the pressing material and passing through the endless conveyor can also flow out of, and be removed from, the region arranged between the endless conveyor and the deflection rollers or deflection rolls, it is advantageous if at least one of the conveying links of the endless conveyor has the hollows on its lower side.

In order also to be able to use the transverse gaps between the conveying links of the endless conveyor for transporting away the liquid escaping from the pressing material, it is advantageous if the hollows provided on the lower side of the at least one conveying link are oriented in such a manner that they connect the transverse gaps offset over the width of the endless conveyor.

In order to allow the endless conveyor to revolve during the operation of the pressing device according to the invention, and in order for this purpose to be able to apply a rotational driving force to the endless conveyor, it is advantageous if the deflection roller or deflection roll has, on the circumferential side, drivers which can be brought into connection in terms of drive with driver receptacles on the endless conveyor.

In a preferred embodiment according to the invention, hollows are designed as driver receptacles.

In order also to be able to repair the conveying links of the endless conveyor in a simple manner when required, it is advantageous if the plates forming a conveying link are connected to one another via screw connections. Such a screw connection can easily be released, for example, if the conveying link concerned has damage in the region of at least one of its conveying link plates.

So that the pressing material compressed in the pressing zone of the pressing device according to the invention cannot escape on both sides of the pressing device, it is advantageous if guide rails for the pressing material, which guide rails are arranged at least in the region of the pressing zone and are oriented in the conveying direction, are provided on both sides of the endless conveyor. Said guide rails also have the function of laterally guiding the endless conveyor.

In order to be able to transmit the driving force readily to the endless conveyor and in order to avoid non-uniform loadings of the endless conveyor, it may be advantageous if the endless conveyor is assigned a tensioning device which prevents the endless conveyor from not sagging at least in regions.

In a preferred embodiment according to the invention, at least one of the deflection rollers is provided in the pressing device in such an adjustable manner that the at least one deflection roller serves as a tensioning means for the endless conveyor.

The production of the pressing device according to the invention and of its endless conveyor is substantially simplified if the conveying link plates of at least one conveying link have the same external outline and preferably the same width, and if the conveying link plates of the at least one conveying link differ preferably only in the bore provided for the screws.

In order to be able to guide the pressing material as reliably and completely as possible into the pressing zone and in order to prevent undesirable clogging of the pressing device upstream of the pressing zone in the revolving direction of the endless conveyor, it is advantageous if the pressing material can be supplied or is supplied from above in the entry region of the pressing device, and if a pressing material guide, which is designed as a revolving conveyor belt, is preferably provided.

The pressing device according to the invention is advantageously usable wherever a pressing material has to be dehumidified and/or compressed. The pressing device according to the invention is advantageously also usable wherever a fluid has to be obtained from a pressing material. A use in which the pressing device is intended for dehumidifying the pressing material and in which the pressing device is provided in particular for dehumidifying wood chips is preferred.

Developments according to the invention emerge from the claims in conjunction with the figures and the description. The invention is explained in more detail below with reference to a preferred exemplary embodiment.

BRIEF DESCRIPTION OF THE PREFERRED EMBODIMENTS

Figure 2:
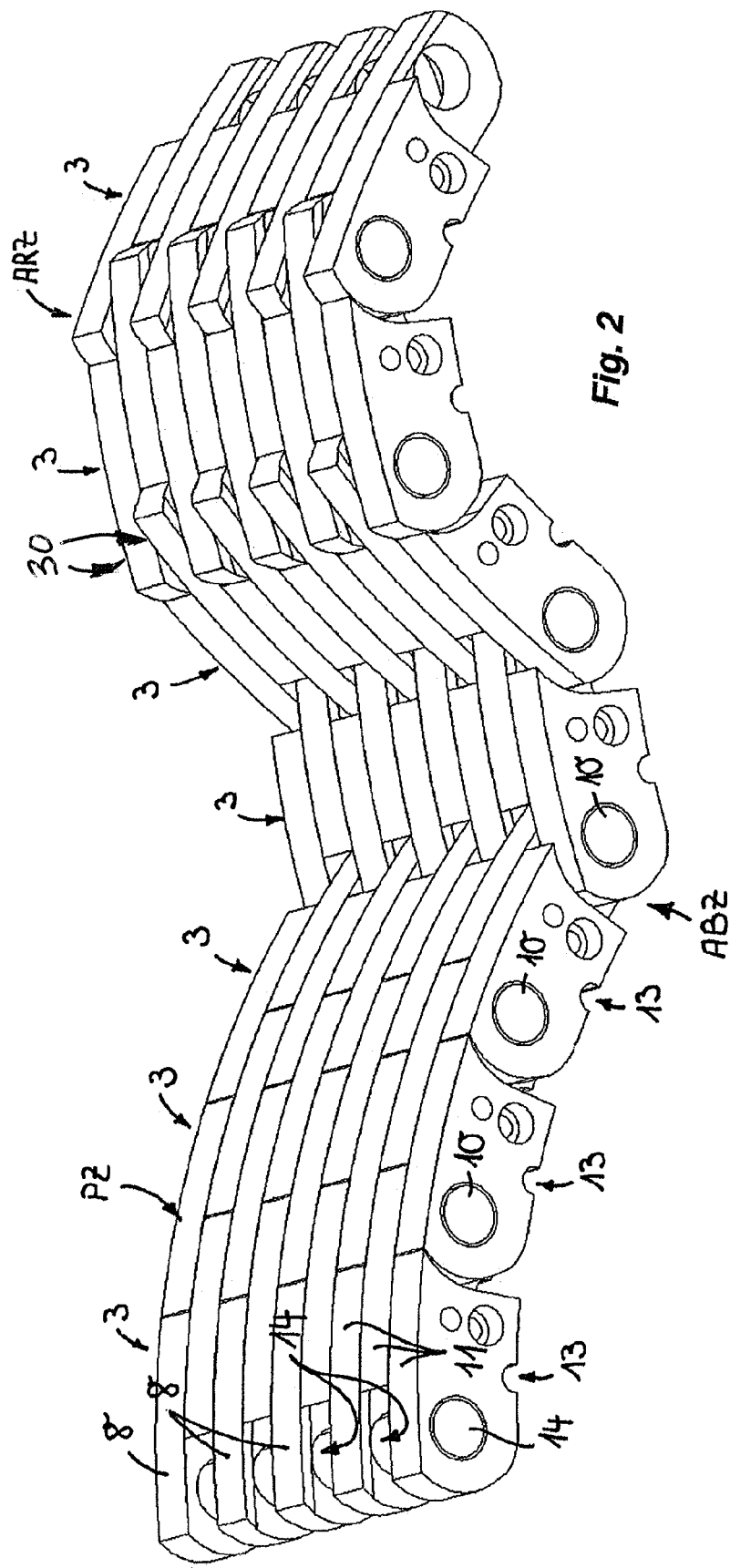
Figure 3:
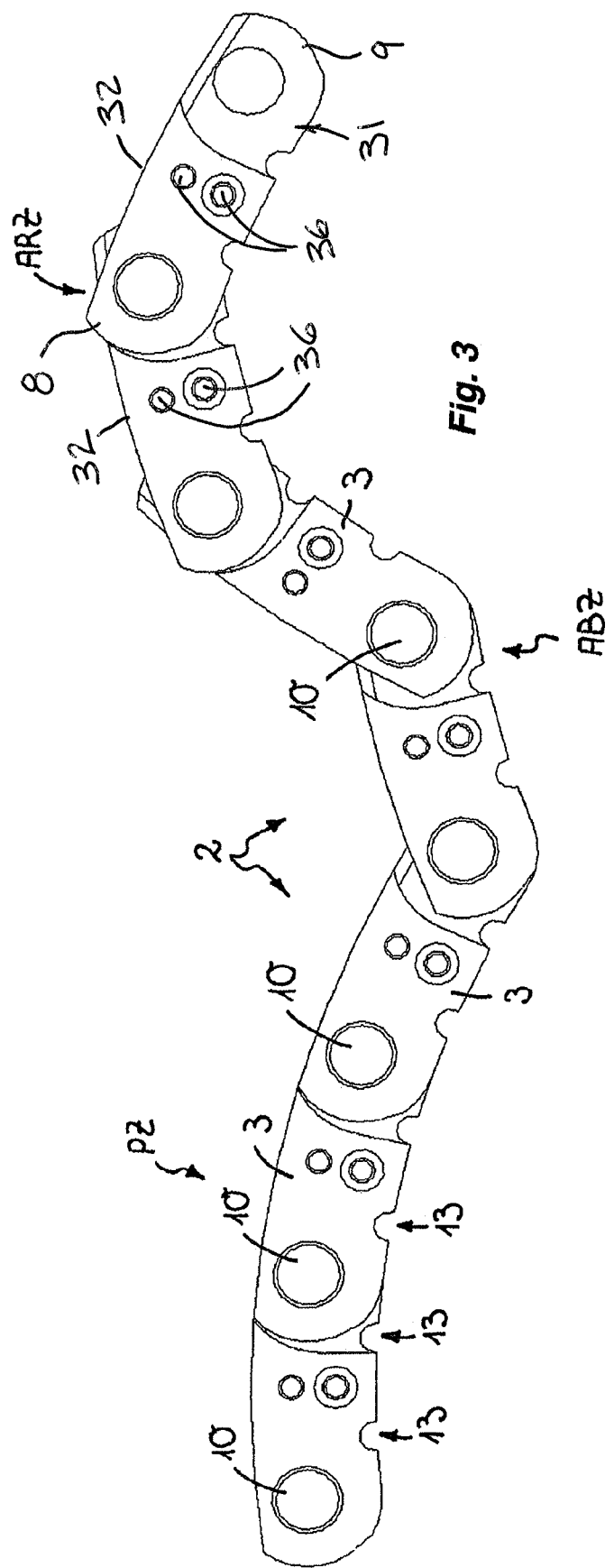
Figure 4:
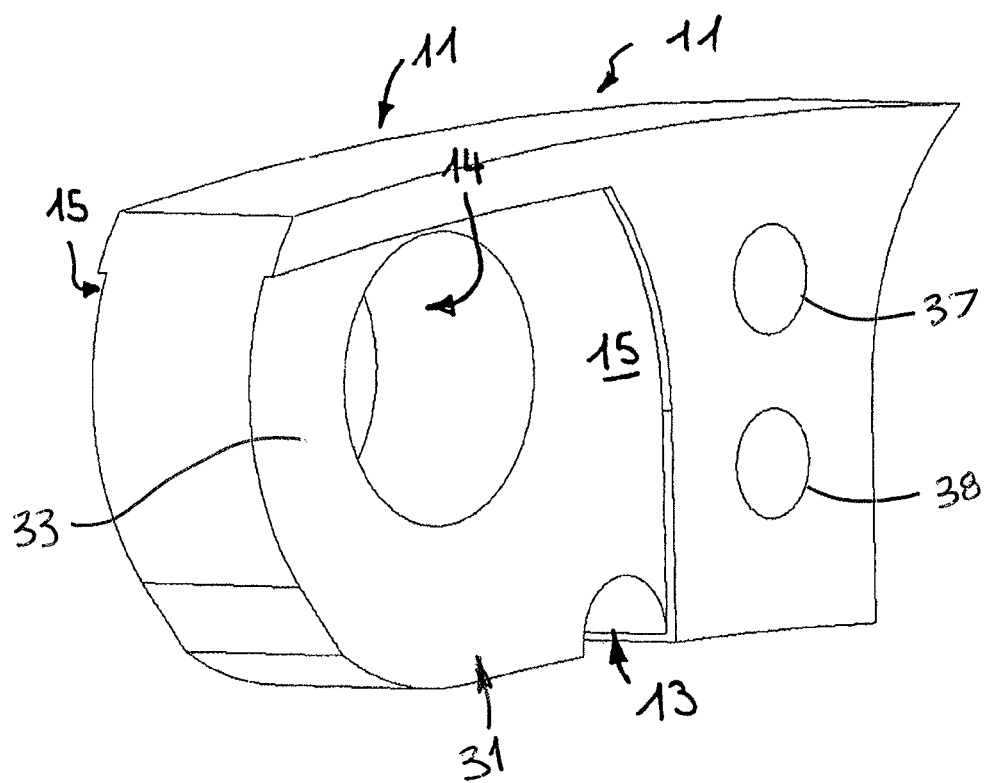
Figure 5:
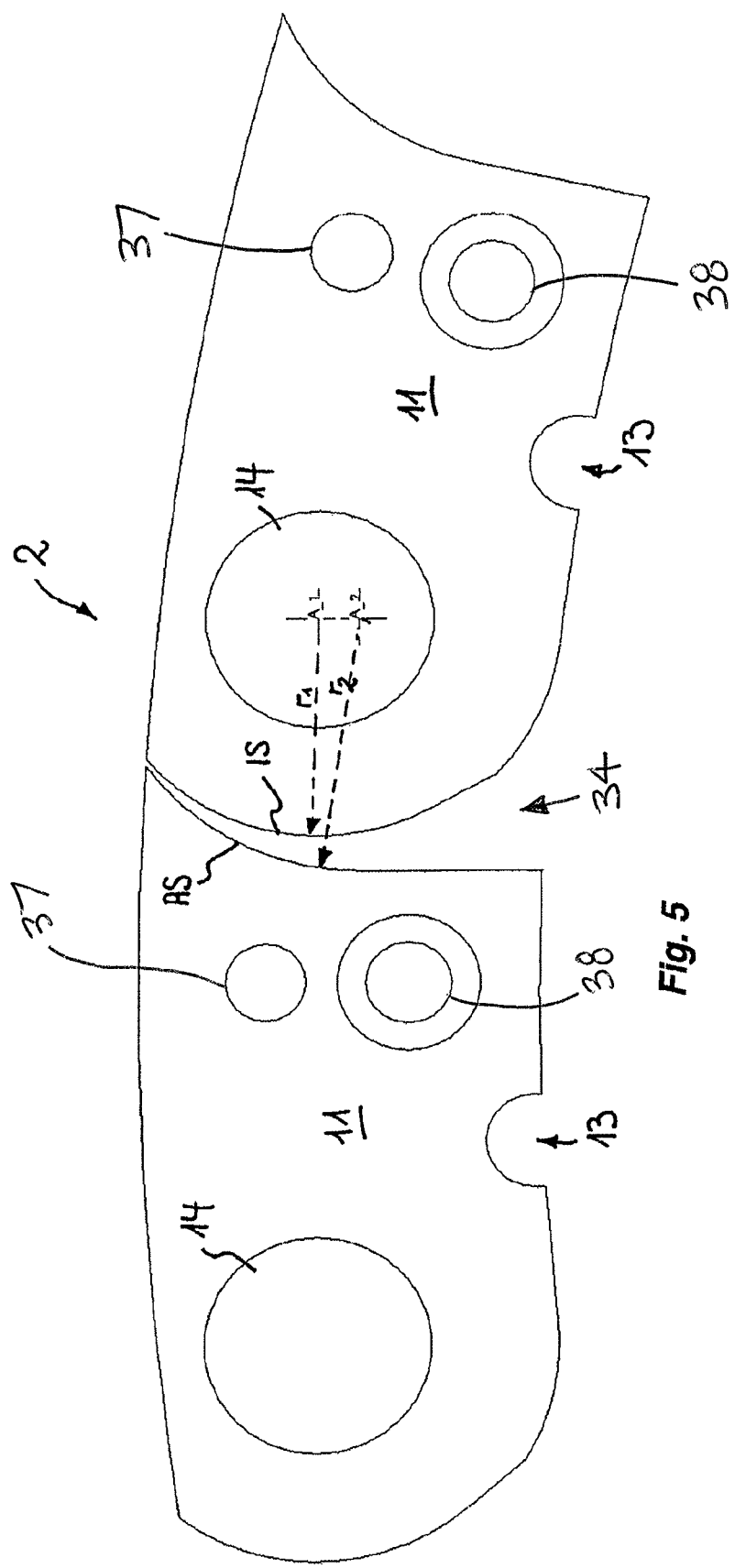
Figure 6:
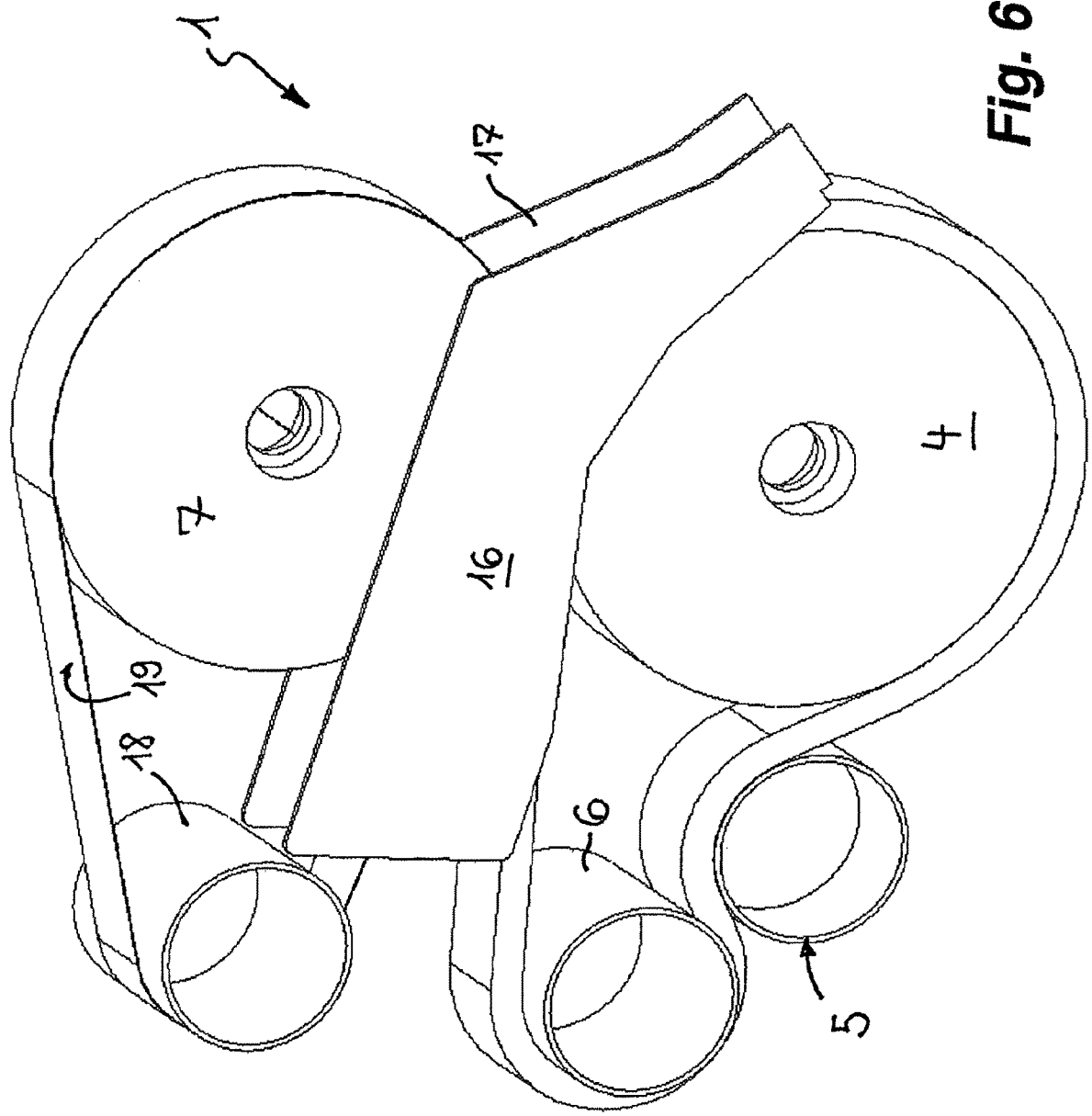

In the figures:

FIG. 1 shows a pressing device which is illustrated in a schematized side view and has an endless conveyor and a pressing roll which is provided in a pressing zone for pressurizing the pressing material, which is conveyed on the endless conveyor, between the pressing roll and the endless conveyor, FIG. 2 shows a portion of the endless conveyor in a perspective top view, wherein the conveying links of the endless conveyor are illustrated in different pivoted positions with respect to one another, FIG. 3 shows the portion of the endless conveyor shown in FIG. 2, in a side view, FIG. 4 shows a conveying link plate of the conveying link, which consists of a packet of conveying link plates, of the endless conveyor shown in FIGS. 1 to 3, FIG. 5 shows two conveying link plates of adjacent conveying links of the endless conveyor, which are shown in FIGS. 1 to 3, in a side view, and FIG. 6 shows the pressing device shown in FIGS. 1 to 5 in a lateral perspective illustration, wherein guide rails which prevent the pressing material from escaping out of the region of the pressing zone are provided on both sides of the endless conveyor.

DETAILED DESCRIPTION OF THE PREFERRED EMBODIMENTS

FIGS. 1 and 6 show a pressing device 1 in a schematic illustration. The pressing device 1 has an endless conveyor 2 which has a multiplicity of conveying links 3 which are connected to one another to form an endlessly revolving track multiply deflected via deflection rollers 4, 5, 6 or deflection rolls. While a portion of the endless conveyor 2 is shown in FIGS. 2 and 3, the conveying links 3 of the endless conveyor 2 are illustrated in more detail in FIGS. 2 to 5.

It becomes clear from FIGS. 2 and 3 that adjacent conveying links 3 of the endless conveyor 2 are connected pivotally to one another in each case via a pin 10 forming a pivot axes.

The pressing device 1 also has at least one pressing roll 7 which is provided in a pressing zone PZ in order to pressurize the pressing material, which is conveyed on the endless conveyor 2, between the pressing roll 7 and the endless conveyor 2. It can be seen in FIG. 2 that adjacent conveying links 3 of the endless conveyor 2 have intermeshing fingers 8, 9, formed on outside circumferential partial regions 30, through which the pin 10 connecting said conveying links 3 passes. With reference to the conveying links 3 which are depicted on the left in FIGS. 2 and 3 and are depicted here in a pivoted position corresponding to the pressing zone PZ, it becomes clear that said conveying links 3 adopt such a pivoted position with respect to one another in the pressing zone PZ that the outside of the endless conveyor 2 in this region forms a protrusion and recess less surface which is closed in a plate like manner and is capable of withstanding even high pressurization without there having to be a concern that relatively large quantities of the pressing material will be pressed through the endless conveyor 2 as far as the inside thereof. Since adjacent conveying links 3 of the endless conveyor 2 have intermeshing fingers 8, 9, through which the pin 10 connecting the conveying links 3 passes, the pin 10 of the adjacent conveying links 3 is also arranged in a protected manner, wherein the intermeshing fingers 8, 9 also ensure a closed, plate like surface on the outside of the endless conveyor 2 in this region. The most small quantity of the pressing material which is pressed into the endless conveyor 2 in the pressing zone PZ are removed from the endless conveyor 2 after the pressing zone PZ because the pressing zone PZ is followed by a breaking-open zone ABZ in the revolving direction of the endless conveyor 2, in which breaking-open zone ABZ the endless conveyor 2 is deflected in such a manner that the outside thereof is bent concavely. The pressing device 1 shown here is therefore distinguished by an endless conveyor 2 which has a high load bearing capacity and on which the pressing material can be pressurized in such a manner that the moisture contained in the pressing material can be particularly readily separated from the dry mass of the pressing material. Furthermore, the pressing device 1 illustrated here is also distinguished by high efficiency.

It is shown in FIGS. 2 and 3 that the conveying links 3 are formed from at least two conveying link plates 11 bearing against one another on the flat sides, which conveying link plates 11 are connected to one another to form a plate packet 32 in an offset manner such that the outer narrow sides thereof belong to the outside of the endless conveyor, and that a partial region 31 of at least one second conveying link plate 11, which partial region 31 protrudes over at least one conveying link plate 11, is designed as a finger 8, 9. The intermeshing fingers 8, 9 of adjacent conveying links 3 are passed through by the pin 10 connecting said conveying links 3. Since adjacent conveying links 3 of the endless conveyor 2 have intermeshing fingers 8, 9, through which the pin 10 connecting said conveying links 3 passes, the pin 10 of the adjacent conveying links 3 is also arranged in a protected manner, wherein the intermeshing fingers 8, 9 also ensure a surface, which is closed in a plate like manner, on the outside the endless conveyor 2 in this region. In particular, the fingers 8 of a conveying link 3 can fill the spacings between the fingers 9 of an adjacent conveying link 3 very substantially—in particular apart from gaps remaining there between—and vice versa, at least in the region of the pin 10 on the outside of the endless conveyor 2.

The conveying links 3 of the endless conveyor 2 illustrated here are designed as a plate package which is formed from at least one first and at least two second conveying link plates 11. It can be seen in FIGS. 2 to 5 that the endless conveyor 2 has, on its inside, hollows 13 which are oriented transversely with respect to the conveying direction and which facilitate the flowing off of the fluid squeezed out by means of the pressing device 1 according to the invention in the region between the endless conveyor 2 and the deflection rollers, in particular the deflection roller 4. The hollows 13 are designed here as flutes or channels oriented at right angles to the conveying direction.

It becomes clear from a comparison of FIGS. 1 to 3 and the hollows 13 shown there and also the deflection roller 4 likewise depicted there that the hollows 13 are arranged distributed at uniform spacings over the inner circumference of the endless conveyor 2.

It can be seen in FIG. 1 that a clearing-out zone ARZ is arranged between the breaking-open zone ABZ and the pressing zone PZ in the revolving direction of the endless conveyor, in which clearing-out zone ARZ the endless conveyor 2 is deflected in such a manner that its outside is bent convexly. It can be seen in FIG. 1 that the deflection roller or deflection roll 4 and the pressing roll or pressing roller 7 are at the smallest distance from one another at a point or in a region of the pressing zone PZ that is arranged on a line running through the axes of rotation of said rollers 4, 7 or rolls. The deflection roller 4 provided in the pressing zone PZ has a larger diameter than the deflection rollers 5, 6 arranged in the breaking-open zone ABZ and/or in the clearing-out zone ARZ.

It is shown in FIGS. 2 to 5 that the fingers 8, 9 of the conveying links 2 each have a hole 14, in which holes 14 the pin 10 connecting adjacent conveying links 2 passes through the conveying links 2. Particularly good pivotability of the adjacent conveying links 2 about the pin 10 forming the pivot axes is promoted if the holes 14 provided on the fingers 8, 9 of the conveying links 2, or preferably on the pins 10, a low friction of friction-reducing coating and in particular a TEFLON™ (Polytetrafluoroethylene) coating is provided.

As the side view, which is shown in FIG. 4, of one of the conveying link plates 11 forming a conveying link 2 shows, a flat sided molding 15 which is open toward the inside of the endless conveyor 2 can be provided at least on one side of, and preferably—as here—on both sides of the conveying links 2. In order to form an outside which is closed as far as possible toward the outside of the endless conveyor 2, the fingers 8, 9 have a greater thickness than the finger partial region 33 otherwise surrounding the hole 14 in the corresponding finger 8, 9.

It is indicated in the side view in FIG. 5 that the hole center points of the holes 14 provided in the fingers 8, 9 are aligned with one another. The center point A2 of the radii which are provided in the outside AS of the transverse gaps 34 and which are larger than the radii on the inside IS of the transverse gaps 34 are arranged at a lower level, wherein the endless conveyor 2 forms an outside which is virtually closed in a plate like manner in the pressing zone PZ. As a result, an opening in the gap arises toward the inside while the transverse gaps 34 open in the breaking-open zone ABZ. In the clearing out zone ARZ, the pressing material which has been pressed in toward the inside of the endless conveyor is stripped off or pressed through onto the outside thereof. It can also be seen that the conveying links have, on their lower side forming the inside of the endless conveyor 2, a radius which corresponds approximately to the radius of the deflection roller 4 in the pressing zone. By contrast, the upper side of the conveying links 3, which upper side forms the outside of the endless conveyor 2, has a larger radius corresponding to the overall height of the endless conveyor 2.

The pressing device 1 illustrated here is provided in particular for dehumidifying wood chips. The pressing device 1 permits a continuously operating pressing process.

The aim of this pressing process is to separate liquid or viscous components of a pressing material from the pressing material. The endless conveyor 2 of the pressing device 1 forms a self-cleaning mechanical separating system which already separates the liquid or viscous components from one another in the pressing zone and therefore prevents reabsorption of said components by the pressing material or remixing with the pressing material after leaving the pressing zone PZ.

It is not illustrated further here that the pressing roll 7 on the one hand and the deflection roll 4 supporting the endless conveyor 2 on the other are pressed together with the aid of hydraulics. For this purpose, the pressing roll 7 and the deflection roller 4 are mounted rotatably on two horizontal levers. These levers are pressed together with the aid of the hydraulics mentioned. The endless conveyor 2 is guided between the rollers or rolls 4, 7. The pressing material located on the endless conveyor 2 is supplied to the pressing zone PZ with the aid of the endless conveyor 2. The deflection roller 4 and the pressing roll 7 are rotationally drivable with the aid of a roller or roll drive, wherein the chain-like endless conveyor 2 is drawn along in the pressing zone PZ because of the force-fitting connection.

The hollows 13 can be seen in FIGS. 2 to 5. These hollows 13 are provided on the lower side of the conveying links 3 and are preferably oriented in such a manner that they connect the transverse gaps 34, which are offset over the width of the endless conveyor 2, to one another. It is indicated in FIG. 1 that the deflection roller 4 has, on the circumferential side, drivers 35 which can be brought into connection in terms of drive with driver receptacles on the endless conveyor 2. The embodiment illustrated here in which hollows 13 form the driver receptacles provided on the endless conveyor 2 is preferred.

The conveying link plates 11 which form a conveying link 3 and have approximately the same external contour and preferably the same width and which differ preferably only in the bores 37, 38 provided for the screws are connected to one another via screw connections 36, shown in FIG. 3. For this purpose, screws which pass through a screw opening passing through the conveying link 3 are provided. The screw head is countersunk on the border side conveying link plate 11. By contrast, the conveying link plate provided on the opposite side of the endless conveyor has an internal thread in which the associated screw engages. In the conveying link plates lying in between, the passage holes are formed without a thread, and therefore the screws can pass through the passage holes assigned thereto in said conveying link plates. The endless conveyor 2 does not have any protrusions on its outsides on both sides. It can readily be seen in FIG. 5 that the smaller bores 37, 38, which are shown there one above another, are intended for the screwing together of the conveying plates.

The pressing material to be squeezed out is placed onto the outside of the endless conveyor 2 upstream of the pressing zone PZ in the conveying direction. The pressing material can fall here onto the endless conveyor 2 before the pressing material located on the endless conveyor 2 is supplied to the pressing zone PZ of the pressing device 1. It becomes clear from a comparison of FIGS. 1 and 6 that guide rails 16, 17 which are arranged at least in the region of the pressing zone PZ and are oriented in the conveying direction are provided on both sides of the endless conveyor 2 and are intended to hold the pressing material on the endless conveyor 2 and to prevent said pressing material from moving toward the side. The endless conveyor 2 is also guided by the guide rails 16, 17 on both sides.

In the pressing zone PZ, the pressing roll 7 runs over the pressing material located on the outside of the endless conveyor 2. The pressing roll 7 is pressed here onto the pressing material. The pressing material, owing to the pressing pressure exerted thereon, outputs the fluid, which is located up to now in the pressing material, in the pressing zone PZ. The pressing material portions still located on the endless conveyor 2 downstream of the pressing zone PZ can be scraped off from the endless conveyor 2 with the aid of a preferably fixed scraper arranged on the outside of the endless conveyor 2 before the corresponding portion of the endless conveyor 2 is used for a new pressing process. The fluid pressed out of the pressing material in the pressing zone PZ is conducted away toward the sides on both sides through the gaps in the endless conveyor 2 that remain between the conveying links 3 of the endless conveyor 2 and the conveying link plates 11 or the fingers 8 and 9.

Since these gaps open toward the inside to an extent such that certain cavities also arise there, and since said cavities are of such large dimensions in comparison to the squeezed-out quantity of fluid that considerable quantities of the fluid can be temporarily stored in the endless conveyor 2—isolated from the dry pressing material—before they subsequently leave the pressing zone PZ, the outflow of the squeezed-out fluid is promoted and an increase in the performance of the pressing device is achieved. Since the hollows 13 connect the cavities arising because of the gaps to one another, the outflow of the squeezed-out fluid is also additionally improved. The fluid flowing away from the endless conveyor 2 is separated from the pressing material squeezed out in such a manner and can no longer be absorbed by the now dried pressing material. The fluid which has been separated from the pressing material is extracted from the further pressing process.

In the inlet region of the pressing device 1, which inlet region leads to the pressing zone PZ and in which the endless conveyor 2 forms a virtually unbent track, the gaps located between the conveying links 3 are closed to such an extent that the pressing material cannot fall through. The pressing material is supplied from above in the inlet region of the pressing device 1. It can be seen in FIGS. 1 and 6 that the pressing device has a pressing material guide which is designed as a revolving conveyor belt 19 guided over the pressing roll 7 and the deflection roller 18. The conveyor belt 19 is designed here as a steel belt which can withstand even high pressures.

Since the endless conveyor virtually halves the inlet angle provided between the pressing roll 7 on the one hand and the deflection roller 4 on the other, the intake of the pressing material into the pressing zone PZ is improved. In the pressing zone PZ, the chain-like endless conveyor 2 lies between the rolls 4, 7 which are pressed against each other. In the pressing zone PZ, in which the endless conveyor 2 rests on the deflecting roller 4, the gaps provided in the endless conveyor 2 are virtually completely closed toward the outside while they are open toward the inside. This open design on the inside comes about by means of the opening of the gaps toward the inside. Since the endless conveyor 2 is formed in a virtually protrusion- and recess-less manner in the pressing zone PZ and does not have any corners or edges, the transmission of force of the rotational movement exerted by pressing roll 7 and deflection roller 4 is also readily transmitted to the endless conveyor 2. By the deflection of the endless conveyor 2, which deflection is provided in the breaking-open zone ABZ, the transverse and longitudinal gaps, which are located between the conveying links 3, of the endless conveyor 2 are opened. Constituent parts of the pressing material that are pressed into the endless conveyor 2 can be loosened here by the relative movement of the opposite gap surfaces and pushed out through the opened gap. By the deflection which is provided in the clearing-out zone ARZ and in which the endless conveyor 2 assumes a convex curvature on the outside thereof, the gap surfaces are again moved relative to one another. Pressed-in pressing material residues remaining in the gaps are pushed to the lower side of the endless conveyor 2 or are pressed outward out of the gap. Following the clearing-out zone ARZ, the gaps located between the conveying links 3 are again free and the endless conveyor 2 can be used for a further filling and pressing process. In a continuous pressing process, the conveying links 3 of the endless conveyor 2 open and close, and therefore preferably liquid or viscous constituent parts in the pressing material can be pressed out and separated by the gaps in the endless conveyor 2 from the pressing material dried in such a manner.

The endless conveyor 2 is virtually completely closed on the outside thereof in the pressing zone PZ, while the inside of the endless conveyor 2 is designed to be very open. This is achieved by the fact that the radius $r_1$ on the inside IS of the transverse gaps is aligned with the center point $A_1$ of the pins 10 while the center point $A_2$ of the radius $r_2$ of the outside AS is arranged therebelow to an extent such that the two radii virtually converge on the upper side of the chain, but are sufficiently far apart on the lower side. The open design of the inside of the endless conveyor, with the outside simultaneously closed, is furthermore improved by the molding 15 and the hollows 13. In addition, the radius $r_2$ to the outside AS of the transverse gaps is larger than the radius $r_1$ on the inside IS of said transverse gaps between the conveying links 3. Each conveying link 3 has two axes of rotation which are each arranged with respect to the adjacent conveying links. The longitudinal gaps between the conveying link plates 11 bearing against one another are virtually closed on the outside of the endless conveyor 2. Since the endless conveyor bears the moldings 15 in its central and lower region, a clearance which facilitates the flowing off of the squeezed-out fluid is provided between the conveying link plates 11. Easy flowing off of the squeezed-out fluid is also promoted by the fact that the hollows 13 are arranged on the inside of the endless conveyor 2. The lower side of the conveying links 3, which lower side forms the inside of the endless conveyor 2, has a radius which approximately corresponds to the radius of the deflection rollers or deflection rolls and in particular of the deflection roller 4. The radius on the upper side of the conveying links 3, which upper side forms the outside of the endless conveyor 2, is larger corresponding to the overall height of the endless conveyor 2, and therefore the outside of the endless conveyor 2 when spanning a deflection roller or deflection roll 4, 5, 6 would form a circle or cylinder. The openings in the endless conveyor 2 are adapted in such a manner that, when the endless conveyor 2 is placed onto the deflection roller 4 in the region of the pressing zone PZ, said openings close. In the pressing zone PZ, said openings in the endless conveyor 2 are closed to the extent that preferably liquid or viscous constituent parts of the pressing material can flow through the openings in the endless conveyor 2.

The geometry of the transverse gaps provided between the adjacent conveying links 3 makes it possible for the endless conveyor 2 to bend up. The pressing material is loosened in the process by means of the relative movement of the gap surfaces. In the clearing-out zone ARZ, the material possibly pressed into the endless conveyor 2 is removed. The endless conveyor 2 buckles here in a manner similar to a cat's arched back. The lug of the conveying links 3 that protrudes on the outside travels here over the radius of the inside, as a result of which any material which is penetrated is stripped off toward the inside of the endless conveyor 2 or is pressed through to the outside of the endless conveyor 2. The individual conveying links 3 are either of a sufficient length or are connected to one another in such a manner that the transverse gaps are at a distance from one another to an extent such that the endless conveyor 2 can be guided around a smaller radius than the radius of the pressing roll without individual constituent parts of the endless conveyor 2 colliding with one another.

The invention claimed is:

1. A pressing device comprising, an endless conveyor having a multiplicity of conveying links connected to one another to form an endlessly revolving track, adjacent ones of the conveying links are pivotally connected to one another in each case via a pin forming a pivot axes, and at least one pressing roll provided in a pressing zone in order to pressurize a pressing material to be conveyed on the endless conveyor between the pressing roll and the endless conveyor, adjacent ones of the conveying links of the endless conveyor have intermeshing fingers, the pin connecting said conveying links passes through said fingers, and the conveying links take up a pivoted position with respect to one another in the pressing zone such that an outside of the endless conveyor that faces the pressing roll and is configured to receive the pressing material forms a protrusion-less and recess-less surface that is convex relative to the pressing roll, the pressing zone is followed by a breaking-open zone in a revolving direction of the endless conveyor, and the endless conveyor is deflected such that the outside thereof is bent concavely in the breaking-open zone, a deflection roller is located in the pressing zone that the endless conveyor revolves about, the deflection roller or deflection roll and the pressing roll are at a smallest distance from each other in the pressing zone which is at a point or in a region that is arranged on a line or plane running through axes of rotation of said deflection roller or deflection roll and said pressing roll, and a clearing-out zone between the breaking-open zone and the pressing zone in the revolving direction of the endless conveyor, and the endless conveyor is deflected in said clearing-out zone such that the outside is bent convexly.

2. The pressing device as claimed in claim 1, wherein at least one of the conveying links is formed integrally and, on an outside circumferential partial region thereof facing an adjacent one of the conveying links, bears at least one of the protruding fingers.

3. The pressing device as claimed in claim 1, wherein at least one of the conveying links is formed from at least two conveying link plates that bear against one another on flat sides thereof and are connected offset to one another such that a partial region of a second one of the conveying link plates that protrudes over a first one of the conveying link plates forms one of the fingers.

4. The pressing device as claimed in claim 1, wherein at least one of the conveying links is formed either from at least one of a first conveying link plate and two second conveying link plates that protrude over the first conveying link plate, or from two first conveying link plates and one second conveying link plate that protrudes over the first conveying link plates.

5. The pressing device as claimed in claim 1, wherein the endless conveyor has, on an inside thereof, hollows oriented transversely with respect to the conveying direction, and a rotationally drivable one of said deflection roller that drives the endless conveyor engages in the hollows.

6. The pressing device as claimed in claim 5, wherein the hollows comprise flutes or channels oriented at right angles to the conveying direction.

7. The pressing device as claimed in claim 5, wherein the hollows are arranged distributed at uniform distances over an inner circumference of the endless conveyor.

8. The pressing device as claimed in claim 1, wherein the deflection roller provided in the pressing zone has a larger diameter than an additional deflection roller arranged in at least one of the breaking-open zone or the clearing-out zone.

9. The pressing device as claimed in claim 1, wherein the fingers of the conveying links each have a hole, and the pin connecting adjacent ones of the conveying links passes through said holes of the conveying links.

10. The pressing device as claimed in claim 9, wherein the pins or the holes or the pins and the holes provided on the fingers of the conveying links have a low-friction or friction-reducing coating.

11. The pressing device as claimed in claim 10, further comprising a flat-sided molding open toward an inside provided at least on one side of the fingers of the conveying links.

12. The pressing device as claimed in claim 11, wherein the fingers have a larger width at the outside of the endless conveyor than a width of a finger partial region surrounding the hole.

13. The pressing device as claimed in claim 9, wherein a center point of a radius on an outside of a transverse gap in one of the conveying links is formed lower from an outer surface of the conveyor than a center point of the holes such that gaps between said conveying links are closed toward an outside of the endless conveyor in the pressing zone and open toward an inside of the endless conveyor.

14. The pressing device as claimed in claim 1, wherein the conveying links have, on a lower side thereof forming an inside of the endless conveyor, a radius approximately corresponding to a radius of the deflection roller.

15. The pressing device as claimed in claim 1, wherein the conveying links have, on an outer side thereof forming the outside of the endless conveyor, a larger radius than a radius provided on a lower side of the conveying links, corresponding to an overall height of the endless conveyor.

16. The pressing device as claimed in claim 5, wherein at least one of the conveying links of the endless conveyor has the hollows on a lower side thereof.

17. The pressing device as claimed in claim 16, wherein the hollows provided on the lower side of the at least one conveying link are oriented in such a manner that the hollows are located at transverse gaps between adjacent ones of the conveying links, providing a connected path over a width of the endless conveyor.

18. The pressing device as claimed in claim 1, wherein the deflection roller has, on a circumferential side, drivers that contact driver receptacles on the endless conveyor.

19. The pressing device as claimed in claim 3, wherein the first and second conveying link plates forming one of the conveying links are connected to one another via screw connections.

20. The pressing device as claimed in claim 1, further comprising guide rails arranged at least in a region of the pressing zone and oriented in the conveying direction located on both sides of the endless conveyor.

21. The pressing device as claimed in claim 8, wherein at least one of the deflection rollers acts as a tensioning element for the endless conveyor.

22. The pressing device as claimed in claim 3, wherein the first and second conveying link plates of the at least one conveying link differ only in a bore provided for the pins.

23. The pressing device as claimed in claim 19, wherein the first and second conveying link plates of the at least one conveying link differ only in a bore provided for the screws.

24. A method for dehumidifying material using a pressing device as claimed in claim 1, comprising dehumidifying the pressing material by pressing the material in the pressing zone between the pressing roll and the endless conveyor.

* * * * *